United States Patent

Lemelson

[15] 3,693,983

[45] *Sept. 26, 1972

[54] TAPE CARTRIDGE DRIVE AND TRANSDUCING APPARATUS FOR THE TAPE THEREOF

[72] Inventor: Jerome H. Lemelson, 85 Rector St., Metuchen, N.J. 08840

[ * ] Notice: The portion of the term of this patent subsequent to May 12, 1987, has been disclaimed.

[22] Filed: Nov. 30, 1970

[21] Appl. No.: 93,778

Related U.S. Application Data

[62] Division of Ser. No. 142,748, Aug. 28, 1961, which is a division of Ser. No. 515,417, June 14, 1955, Pat. No. 3,003,109.

[52] U.S. Cl. .............274/4 C, 179/100.2 Z, 274/4 E, 179/100.2 CA

[51] Int. Cl.....G11b 15/24, G11b 15/26, G11b 21/02

[58] Field of Search ........274/4 B, 4 C, 4 R, 4 E, 4 F, 274/4 G, 11 B, 11 C, 11 E; 242/197–200; 179/100.2 Z

[56] References Cited

UNITED STATES PATENTS

| | | | |
|---|---|---|---|
| 2,821,576 | 1/1958 | Gaubert | 274/4 F |
| 2,793,039 | 5/1957 | Hivonimus | 274/4 R |
| 2,911,215 | 11/1959 | Cousino | 179/100.2 Z |
| 2,782,263 | 2/1957 | Hoehn | 274/4 R |
| 2,364,556 | 12/1944 | Sommers | 274/4 D |
| 2,919,866 | 1/1960 | Minott | 242/192 |
| 2,712,448 | 7/1955 | Schroter | 274/4 |
| 2,468,198 | 4/1949 | Heller | 172/100.2 |

*Primary Examiner*—Leonard Forman
*Assistant Examiner*—Dennis A. Dearing

[57] ABSTRACT

A magnetic transducing apparatus is provided employing one or more cartridges or magazines having tape driven between two reels which are rotatably supported within the cartridge. The tape drive and transducing means are supported on a common mount which is movable towards and away from the magazine and is operable to cause the tape drive means and the transducing means to simultaneously engage the tape in the magazine. Means are also provided for power driving either of the reels in the magazine to take up the tape driven past the transducing means by the drive means engaging the tape.

2 Claims, 2 Drawing Figures

Figure 2:
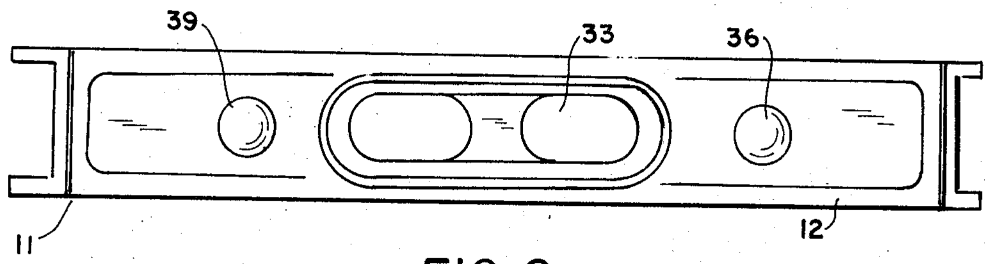

INVENTOR.
JEROME H. LEMELSON

TAPE CARTRIDGE DRIVE AND TRANSDUCING APPARATUS FOR THE TAPE THEREOF

RELATED APPLICATIONS

This is a division of Ser. No. 142,748 filed Aug. 28, 1961, for COMPUTING APPARATUS which was a division of Ser. No. 515,417 filed June 14, 1955, now U.S. Pat. No. 3,003,109.

SUMMARY OF THE INVENTION

This invention relates to an apparatus for transducing signals relative to a magnetic tape located within a housing defining a tape cartridge or magazine. In particular, the invention is concerned with improvements in mechanisms operable to drive and couple one or more transducers to a magnetic tape located within a housing which housing rotationally supports supply and take-up reels for the tape and at least one wheel between said reels which serves to preposition the tape and cooperate in effecting driving of the tape.

Before the making of this invention, it was known in the art to provide a magnetic tape recorder which was operable to receive a container of magnetic tape and, after the performance of certain manipulative functions relative to the tape container, the tape therein and the mechanism associated with the magnetic transducer associated with the recorder, effect transducing operations such as recording on or reproducing from the tape. The mechanisms taught by the prior art have included arrangements employing movement of a magnetic tape magazine along a guided path generally parallel to the side walls thereof to bring the exposed tape into engagement with one or more stationary transducers and fixed drive wheels and movement of the magazine so as to position the tape between a magnetic head and a backing plate. However, it is obvious that such modes of operation and cartridge-player arrangements suffer a number of shortcomings particularly with respect to magazines which are operable to provide tape from a supply reel to a take-up reel therein. Such reel-to-reel operation requires power driving each reel during the transducing and rewind operations as well as separately power driving the tape during the transducing operation to guarantee its constant speed movement past the transducer. Accordingly, it is necessary to couple respective drive means to the supply and take-up reels as well as the means directly engaging and driving the tape. The mechanism becomes relatively complex when the magazine must be moved to bring the tape thereof into engagement with the transducing and drive means as evidenced, for example, by the structures disclosed in U.S. Pat. No. 2,821,576.

In the magazine-recorder arrangement such as provided in U.S. Pat. No. 2,468,138 employing movement of the magazine normal to the surface of magnetic recorder in a manner to position a free length of the tape between the transducer and a backing plate, difficulties are generally experienced in maintaining the free length of tape between the reels taut as it must necessarily be unsupported where it extends across the opening in the magazine side-wall. If the tape becomes slack between the reels after a number of uses, it may engage the head or backing member when the magazine is disposed on the recorder resulting in failure to effect proper alignment and coupling with the head or tearing of the tape. Accordingly, it is a primary object of this invention to provide a new and improved magnetic tape cartridge and playback unit for the tape thereof.

Another object is to provide an improved magnetic tape transducing apparatus employing magnetic tape disposed in a magazine supporting a supply and a take-up reel for the tape therein wherein the playback unit provides means for simultaneously engaging both tape drive means and transducing means as well as means for selectively driving the tape reels.

Another object is to provide a magnetic transducing and tape drive arrangement employing magnetic tape in a container wherein a single actuator is employed to move both a drive means for the tape and a magnetic transducer into engagement with the tape, thereby providing a mechanism which is simple in structure and relatively simple in operation.

Another object is to provide a magnetic record player having transducing means for recordings on magnetic tapes disposed in plural magazines wherein tape magazines are such as to permit the automatic coupling and uncoupling of the transducing means and the tapes of the magazines.

With the above and such other objects in view as may hereafter more fully appear, the invention consists of the novel constructions, combinations and arrangements of parts as will be more fully described and illustrated in the accompanying drawings, but it is to be understood that changes, variations and modifications may be resorted to which fall within the scope of the invention as claimed.

Figure 1:
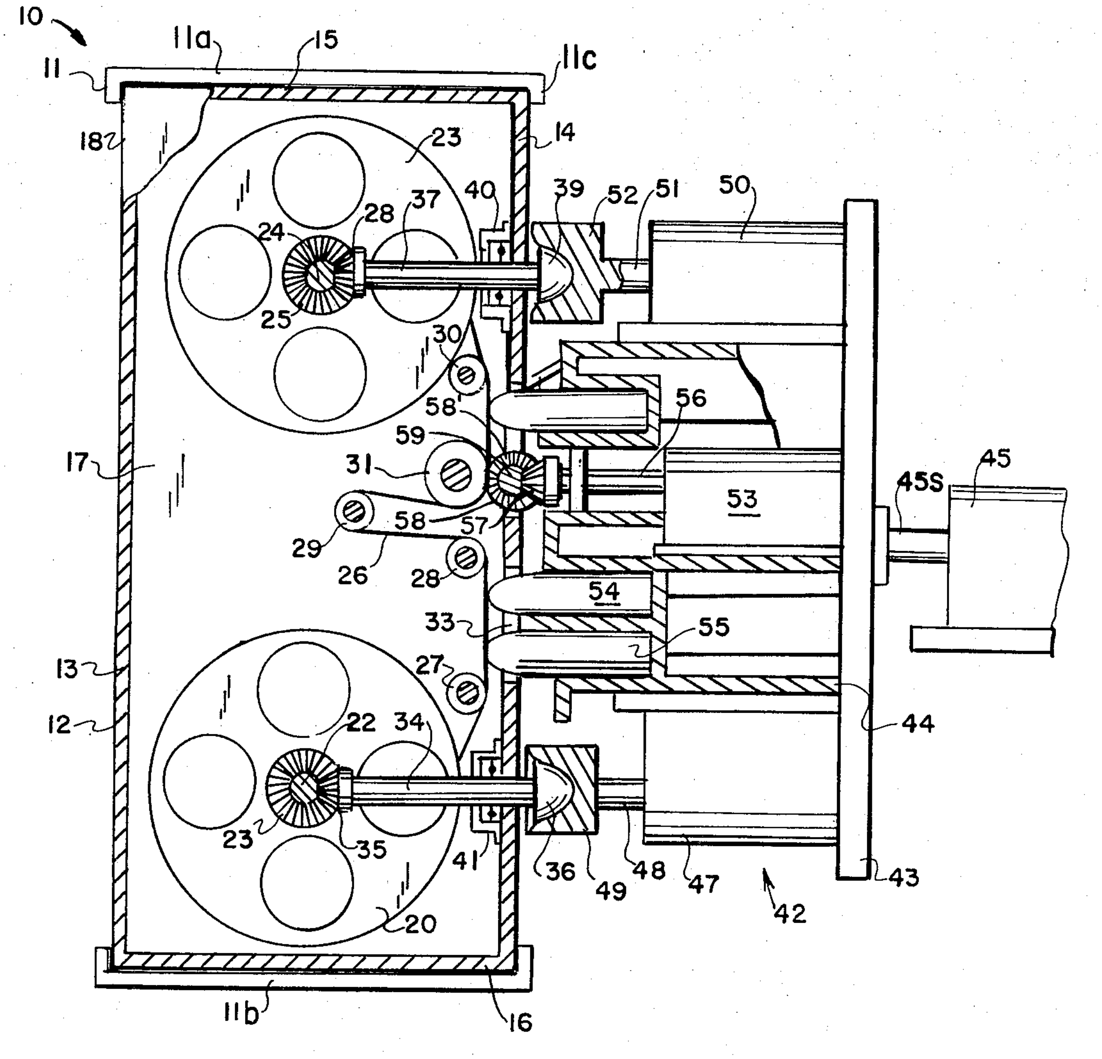

In the drawings:

FIG. 1 is a side view with parts broken away for clarity of a magnetic tape magazine and a combined transducing and drive means for the tape in the magazine, and FIG. 2 is an end view of the magazine of FIG. 1.

There is shown in FIGS. 1 and 2 a magnetic recording and reproduction apparatus 10 comprising a support 11 such as a housing or rack for prepositioning and holding a magazine 12 containing magnetic tape 26 supported and guided therein to travel between a supply reel 20 and a take-up reel 23 both of which are supported for rotation on shafts 22 and 24 by the side walls 17 and 18 of the magazine. The support 11 is shown having a plurality of guides **11*a* and 11*b* for predeterminately locating the upper and lower walls of the magazine 12 and a guide or stop 11*c* for longitudinally locating the magazine with respect to a transducing and driving assembly to be described. The magazine 12 is composed of end walls 13, 14, top and bottom walls 15, 16 and said side walls 17, and 18 and is substantially rectangular parallelepiped in shape. Magnetic tape 26 is guided by a plurality of wheels 27 to 31 which are rotationally supported by the side walls of the magazine housing in a path parallel and adjacent an opening 33 in the end wall 14**.

Upon prepositioning or securing the magazine 12 on the support 11, a transducing and tape driving assembly 42 is operated to bring one or more transducers into operative engagement with the tape and driving means to engage the tape and reel driving means. Shown extending through openings in end-wall 14 and rotatably supported by bearings 40, 41 supported by said end-wall and bearings not shown supported by the side-wall 18 are respective shafts 34 and 37 containing bevel gears 35 and 38 which engage and mesh with bevel gears 23 and 25 supported by the shafts 21 and 24 which support reels 20 and 23. The latter shafts are rotatably supported by the side walls of the magazine 12. Secured to the other ends of shafts 34 and 37 are respective conical coupling members 36 and 39 which serve as means for coupling respective drive means to the shafts.

The tape drive and transducing assembly 42 is composed of a mount 43 which contains a plurality of magnetic heads or transducers 54 and 55 and rotationally supports a drive wheel 58 for the tape preferably in alignment with each other and movable together on the common mount 43 so as to simultaneously engage the tape located adjacent the opening 33 in end wall 14. Also shown supported by support or mount 43 are respective motor operated drive units 47 and 50 which contain respective coupling devices 49 and 52 supported at the ends of their drive shafts 48 and 51 and located to engage the shaped coupling members 36 and 39 at the ends of shafts 34 and 37 when the assembly 42 is operatively located, as shown, with respect to the magazine 12. Drive unit 50 is operable to drive the take-up reel 23 to take up tape as it is fed by the driving action of drive wheel 58 engaging the tape against wheel 31. The drive unit or motor 50 preferably contains a slip clutch or tension responsive means to draw the tape onto reel 23 without driving it from between wheels 31 and 58 or overstretching same.

A third reversible motor 53 is a constant speed motor which is also supported by mount 43 and has a bevel gear 57 secured to the end of its output shaft 56 which gear engages the teeth of a second bevel gear 58' secured to a shaft 59 which is supported in bearing by the housing 44 enclosing the assembly 42. Shaft 59 supports the tape drive wheel or capstan wheel 58 which is driven in rotation by motor 53 and is located in mount 43 so as to engage the tape 26 against a wheel 31 which is supported in rotation by the side wall of the magazine behind the tape and serves as a depressor wheel permitting the capstan wheel to drive the tape in either direction past the heads. When the tape 26 is driven from reel 20 to reel 23, constant speed motor 53 is operable to rotate wheel 58 clockwise and the motor of unit 50 is energized to drive reel 23 to wind the tape thereon while reel 20 is permitted to freely pay out tape by deactivating drive 47. To drive the tape 26 onto reel 20, motor 47 is operated while motor 50 is retained inoperable with its output shaft 51 free to turn so that reel 23 may play out tape to reel 20.

Also shown in FIG. 1 is an actuator 45 for the mount 43 containing the magnetic heads and the drive motors. The actuator may comprise a bi-stable solenoid or motor driven mechanism shown with its output 45S directly connected to the mount 43. When shaft 45S is projected as shown and a magazine is in the operative location illustrated, the magnetic heads 54, 55 are urged into engagement with the tape 26 in the magazine, while the drive wheel 58 is positioned against the tape compressing it against wheel 31 and the coupling devices 49 and 52 of motors 47 and 48 are engaged with coupling members 36 and 39 of the magazine.

In one mode of operation, drive units 50 and 53 are simultaneously operated to cause the tape to be driven at substantially constant speed past the transducers onto take-up reel 23. In another operative mode, the motor 53 is reversed and the motor of drive unit 47 is energized to drive the tape back onto reel 20 at the end of a transducing operation.

I claim:

1. Magnetic tape transducing apparatus comprising in combination with a magazine containing magnetic tape and having walls substantially enclosing said tape therein, a supply reel and a take-up reel supported for rotation within said magazine by the walls thereof, means for guiding the tape of said magazine between said supply and take-up reels, a first tape engaging means rotatably supported behind the tape, an opening in the wall of the magazine in alignment with that portion of the tape aligned with said first tape engaging means, a magnetic transducer head, a moveable support for said transducer head, second tape engaging means rotatably supported on said moveable support for said transducer head, means for prepositioning said moveable support for said transducer head and said magazine in a first relative operative relation prior to effecting a transducing operation with respect to the tape by said transducer head whereby said transducer head and said second tape engaging means are out of engagement with the tape, means for projecting said moveable support when the magazine and support are so prepositioned in said first relative operative relation with respect to each other to a position whereby said transducer head and said second tape engaging means are each simultaneously operatively disposed against the tape and wherein said second tape engaging means compressively engages the tape against said first tape engaging means, first means for rotatably driving one of said first and second tape engaging means to drive the tape from said supply reel past said transducer head, second and third drive means respectively coupleable to said supply and take-up reels of said magazine when said magazine is operatively prepositioned with respect to said support for said transducer head and said second tape engaging means, means for operating said third drive means simultaneously with said means for rotatably driving one of said first and second tape engaging means to rotate said take-up reel and wind the tape thereon simultaneously as the tape is driven past said transducer head by the cooperative driving of said first and second tape engaging means.

2. Magnetic tape transducing apparatus comprising in combination with a magazine containing magnetic tape and having walls substantially enclosing said tape therein, supply and take-up means for magnetic tape disposed within said magazine, means for guiding said tape between said supply and takeup means for providing a section of tape therebetween on which section magnetic transducing may be effected, a first tape engaging means rotatably supported behind said section of tape between said supply and takeup means, a wall of said magazine having an opening therein in alignment with at least part of said section of tape between said supply and take-up means, a magnetic transducer head, a moveable support for said transducer head, a second tape engaging means rotatably supported on said moveable support for said transducer head, means for prepositioning said magazine and said moveable support in first operative relationship prior to effecting a transducing operation with respect to the tape by said transducer head whereby said transducer head and said second tape engaging means mounted on said support are retracted out of engagement with the tape and whereby said opening in said magazine is aligned with both said transducer head and said second tape engaging means, means for projecting said moveable support from said retracted position when the magazine and support are so prepositioned with respect to each other to a position wherein said transducer head and said second tape engaging means simultaneously are advanced through said magazine wall opening against the tape and wherein said second tape engaging means compressively engages the tape against said first tape engaging means, and means for rotatably driving one of said first and second tape engaging means while said tape is compressed therebetween to drive said tape from said supply means past said transducer head and to said take-up means.

* * * * *

REEXAMINATION CERTIFICATE (1264th)

United States Patent [19]

Lemelson

[11] B1 3,693,983

[45] Certificate Issued May 8, 1990

[54] TAPE CARTRIDGE DRIVE AND TRANSDUCING APPARATUS FOR THE TAPE THEREOF

[76] Inventor: Jerome H. Lemelson, 85 Rector St., Metuchen, N.J. 08840

Reexamination Request:

No. 90/001,606, Sep. 26, 1988

Reexamination Certificate for:

| | |
|---|---|
| Patent No.: | **3,693,983** |
| Issued: | **Sep. 26, 1972** |
| Appl. No.: | **93,778** |
| Filed: | **Nov. 30, 1970** |

Related U.S. Application Data

[62] Division of Ser. No. 142,748, Aug. 28, 1961, which is a division of Ser. No. 515,417, Jun. 14, 1955, Pat. No. 3,003,109.

[51] Int. Cl.[5] .................... G11B 15/24; G11B 15/26; G11B 21/02

[52] U.S. Cl. .................................... 360/93; 360/105; 242/199

[58] Field of Search .................... 360/105, 96.3, 96.4, 360/96.5

[56] References Cited

FOREIGN PATENT DOCUMENTS 712536 7/1954 United Kingdom .

*Primary Examiner*—R. S. Tupper

[57] ABSTRACT

A magnetic transducing apparatus is provided employing one or more cartridges or magazines having tape driven between two reels which are rotatably supported within the cartridge. The tape drive and transducing means are supported on a common mount which is movable towards and away from the magazine and is operable to cause the tape drive means and the transducing means to simultaneously engage the tape in the magazine. Means are also provided for power driving either of the reels in the magazine to take up the tape driven past the transducing means by the drive means engaging the tape.

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1 and 2 are cancelled.

* * * * *